Feb. 12, 1924. 1,483,122

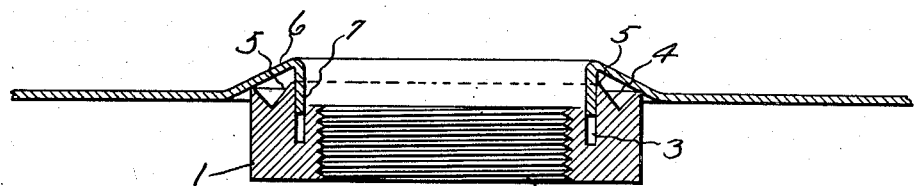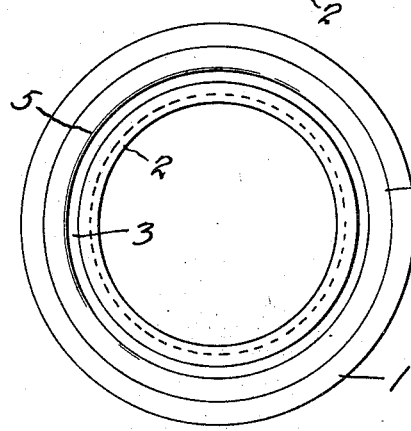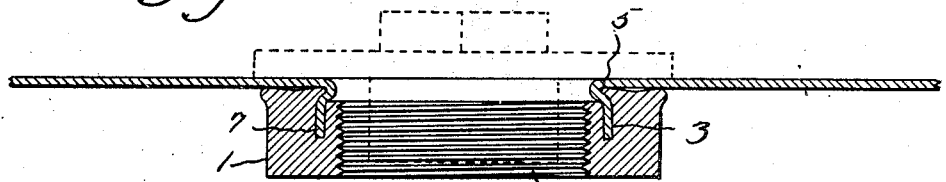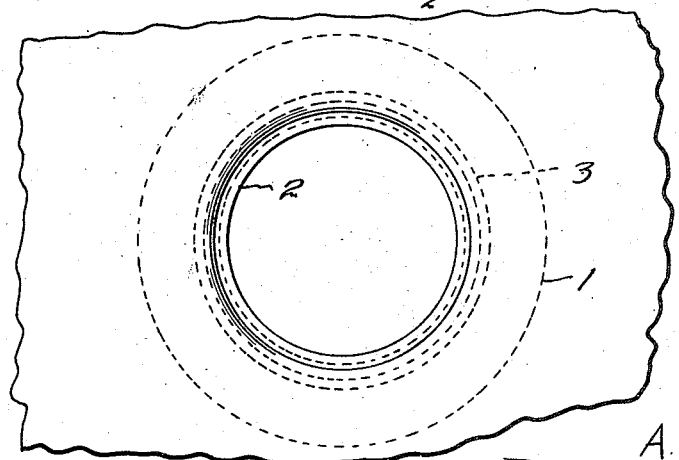

A. SCHROEDER

BUNG FOR METAL CONTAINERS

Filed May 7, 1921  2 Sheets-Sheet 2

Inventor
A. Schroeder
By John A. Bomenhardt
Atty.

Patented Feb. 12, 1924.

1,483,122

UNITED STATES PATENT OFFICE.

ANTHONY SCHROEDER, OF CLEVELAND, OHIO, ASSIGNOR OF ONE-HALF TO JAMES MERLE FINNEY, OF CLEVELAND, OHIO.

BUNG FOR METAL CONTAINERS.

Application filed May 7, 1921. Serial No. 467,718.

*To all whom it may concern:*

Be it known that I, ANTHONY SCHROEDER, a citizen of the United States, residing at Cleveland, in the county of Cuyahoga and State of Ohio, have invented certain new and useful Improvements in Bungs for Metal Containers, of which the following is a specification.

This invention relates to bungs for metal containers, and has for its object to provide improved means for fastening the bung or spud to the wall of the container in such manner that leakage is prevented, but the screw plug can nevertheless be readily inserted in the bung ring to close the same.

A feature of the invention is that the bung ring or bushing is wholly inside of the container, leaving the surface of the sheet metal of the container as a seating surface for the flange of the screw plug or for a gasket inserted under said flange.

The device also makes it unnecessary to weld or braze the parts together.

A further feature of the invention is that by fastening the ring in place in the manner described it is not liable to be knocked off or displaced in transportation or in consequence of rough usage.

A characteristic of the invention is that the bung ring is rather deeply grooved in its outer end, to receive the edge of the sheet metal wall around the opening. This wall is then swaged down to expand the same into close contact with the walls of the groove, whereby a very secure attachment is provided.

The invention has other advantages as will be more fully apparent from the following description and the accompanying drawings in which Fig. 1 is a section of one form of the device in position ready to be attached to the container. Fig. 2 is a top plan of the bushing. Fig. 3 is a section similar to Fig. 1 showing the bushing after it has been pressed into final position. Fig. 4 is a top plan of Fig. 3.

Figure 5:
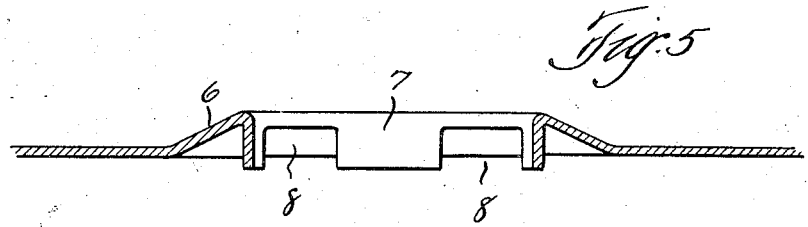
Figure 6:
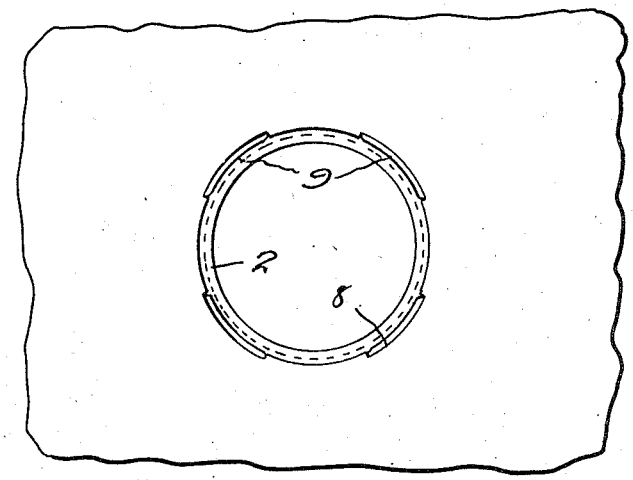
Figure 7:
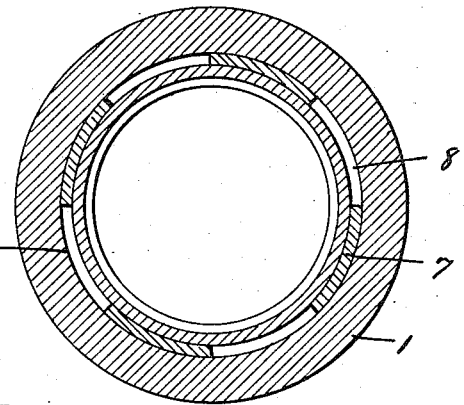
Figure 8:
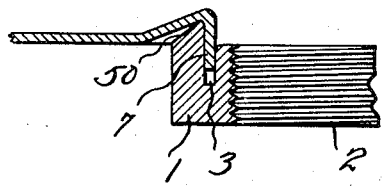

Fig. 5 is a section of a modified form showing a different construction of the container wall around the opening. Fig. 6 is a plan of the modification with the bung in place. Fig. 7 is a horizontal section of a bung attached as in Figs. 5 and 6. Fig. 8 is a detail in section of another modification.

In Fig. 1 the bushing or bung ring is indicated at 1. This is internally threaded as at 2 and at its outer end has a rather deep annular groove 3 outside of which is another V-shaped annular groove 4 the inner wall of which, indicated at 5, is somewhat higher or extends out somewhat farther than the outer wall.

The sheet metal container is provided with an opening around which is a raised part 6, and an inwardly or downwardly extending circular flange 7, of proper size to fit in the groove 3.

These parts are initially constructed in the manner just described, and are assembled as shown in Fig. 1, the bushing 1 being located preferably on the inside of the container with the flange 7 fitting in the groove 3. They are then placed in a press and swaged down to the position shown in Fig. 3. This forces the flange 7 down into the groove 3 and expands the same against the walls of the grooves to form a tight joint. At the same time the metal of the ring 1 adjacent the groove 4 is upset and the inclined wall 5 contracts or is swaged over inwardly to lap the bend over the edge of the bushing, forming a bead or corrugation which securely locks the bushing to the wall of the receptacle. A screw plug can then be inserted in the bushing, as shown in dotted lines in Fig. 3 and the outer wall of the container forms a practically flat seat against which the flange of the plug contacts. Or a gasket may be used between the flange and the container wall if desired. This gives a joint much superior to those in which the plug closes against the surface of the bushing which often has irregularities due to imperfect casting, or which has to be machined to an exact surface. The pressure referred to above forms the surface of the container into a flat and perfect seat for the flange of the plug.

A bung so constructed will be firmly attached without brazing or welding and has the other advantages referred to above.

In the modification shown in Fig. 5 the flange 7 is cut away at intervals, as indicated at 8 in Fig. 5, forming tongues which are swaged into the groove 3, and when the pressure is applied these tongues, at their bends, will be upset or swaged over the edge of the bushing, as indicated at 9 in Fig. 6, to fasten the bushing to the container.

In the modification shown in Fig. 8, the flange 7 is fitted in the groove 3 as explained with respect to Fig. 1, but instead of a groove in the outer face of the bushing, a simple incline 50 is made, forming an edge which will swage over inwardly when pressure is applied, producing a lock substantially like that shown in Fig. 3.

I claim:

1. The combination with a container having an opening and an inwardly extending annular flange around the same, of a bushing within the container, having a groove in which the flange fits, the end of the bushing adjacent the container wall being reduced and swaged inwardly to form a bead in said flange overlying the end of the bushing adjacent the groove.

2. The combination with a container wall having an opening and a flange around the same, of a bung bushing having an inwardly projecting groove in which said flange fits, the end of the bushing adjacent the container having a projecting wall forming an edge fitting against the wall of the container and bent laterally inwardly by pressure to form a corrugation in the flange interlocking with the bushing and overlying the wall thereof inside of the groove.

3. The combination with a container wall having an opening and a flange around the same, of a bung bushing having a groove in which said flange fits, the end of the bushing adjacent the container wall also having a V-shaped groove forming a weakened wall swaged inwardly under pressure against the flange and forming a bead therein interlocking with the bushing.

4. The combination with a container wall having an opening and an annular flange around said opening, of a bung bushing having a groove in which said flange fits, the wall of the bushing outside of the groove being higher than the wall inside of the groove, and said outer wall being weakened and swaged over inwardly forming a bead in said flange overlying the inner wall of the bushing adjacent said groove.

In testimony whereof, I affix my signature in presence of two witnesses.

ANTHONY SCHROEDER.

Witnesses:
JOHN A. BOMMHARDT,
BESSIE F. POLLOK.